United States Patent
Lee

(10) Patent No.: US 8,134,805 B2
(45) Date of Patent: Mar. 13, 2012

(54) SILENT RETRACT OF HEADS IN A HARD DISK DRIVE

(76) Inventor: Bong Jin Lee, Fremont, CA (US)

( * ) Notice: Subject to any disclaimer, the term of this patent is extended or adjusted under 35 U.S.C. 154(b) by 386 days.

(21) Appl. No.: 12/416,621

(22) Filed: Apr. 1, 2009

(65) Prior Publication Data

US 2010/0254045 A1  Oct. 7, 2010

(51) Int. Cl.
G11B 5/54 (2006.01)
(52) U.S. Cl. ...................... 360/256.2; 360/254
(58) Field of Classification Search ............... 360/256.2, 360/254
See application file for complete search history.

(56) References Cited

U.S. PATENT DOCUMENTS 6,278,570 B1 * 8/2001 Kanamaru et al. ............. 360/75

* cited by examiner

Primary Examiner — Ly D Pham

(57) ABSTRACT

A hard disk drive with an actuator arm assembly that is coupled to a head and includes a voice coil motor. The drive also includes a drive circuit that provides a drive current to the voice coil motor to move the actuator arm assembly into contact with a magnet. The drive circuit limits an amplitude, and/or changes the pulse width, of the drive current as the actuator arm assembly approaches the magnet. Limiting the amplitude and/or changing the pulse widths reduces any audible noise associated with retracting the heads.

14 Claims, 4 Drawing Sheets

SILENT RETRACT OF HEADS IN A HARD DISK DRIVE

BACKGROUND OF THE INVENTION

1. Field of the Invention

The present invention relates to the retracting of a head from a disk in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

When a drive is not in use the heads are typically moved off of the disks. For example, the heads can be moved onto a mechanical ramp. The drive may include a magnet that applies a magnetic force to the actuator arm and holds the heads in a retract position. As the actuator arm approaches the magnet the magnetic force tends to pull and accelerate the arm. This can lead to an undesirable crashing of the arm into the magnet. To counter the pulling magnetic force of the magnet a reverse current can be applied to the voice coil motor to slow down the arm. Present slow down schemes create an audible noise. It is generally undesirable to have an audible noise emanating from a hard disk drive.

BRIEF SUMMARY OF THE INVENTION

A hard disk drive with an actuator arm assembly that is coupled to a head and includes a voice coil motor. The drive also includes a drive circuit that provides a drive current to the voice coil motor to move the actuator arm assembly into contact with a magnet. The drive circuit limits an amplitude, and/or changes the pulse width, of the drive current as the actuator arm assembly approaches the crash stop.

DETAILED DESCRIPTION

Described is a hard disk drive with an actuator arm assembly that is coupled to a head and includes a voice coil motor. The drive also includes a drive circuit that provides a drive current to the voice coil motor to move the actuator arm assembly into contact with a magnet. The drive circuit limits an amplitude, and/or changes the pulse width, of the drive current as the actuator arm assembly approaches the magnet. Limiting the amplitude and/or changing the pulse widths reduces any audible noise associated with retracting the heads.

Figure 1:
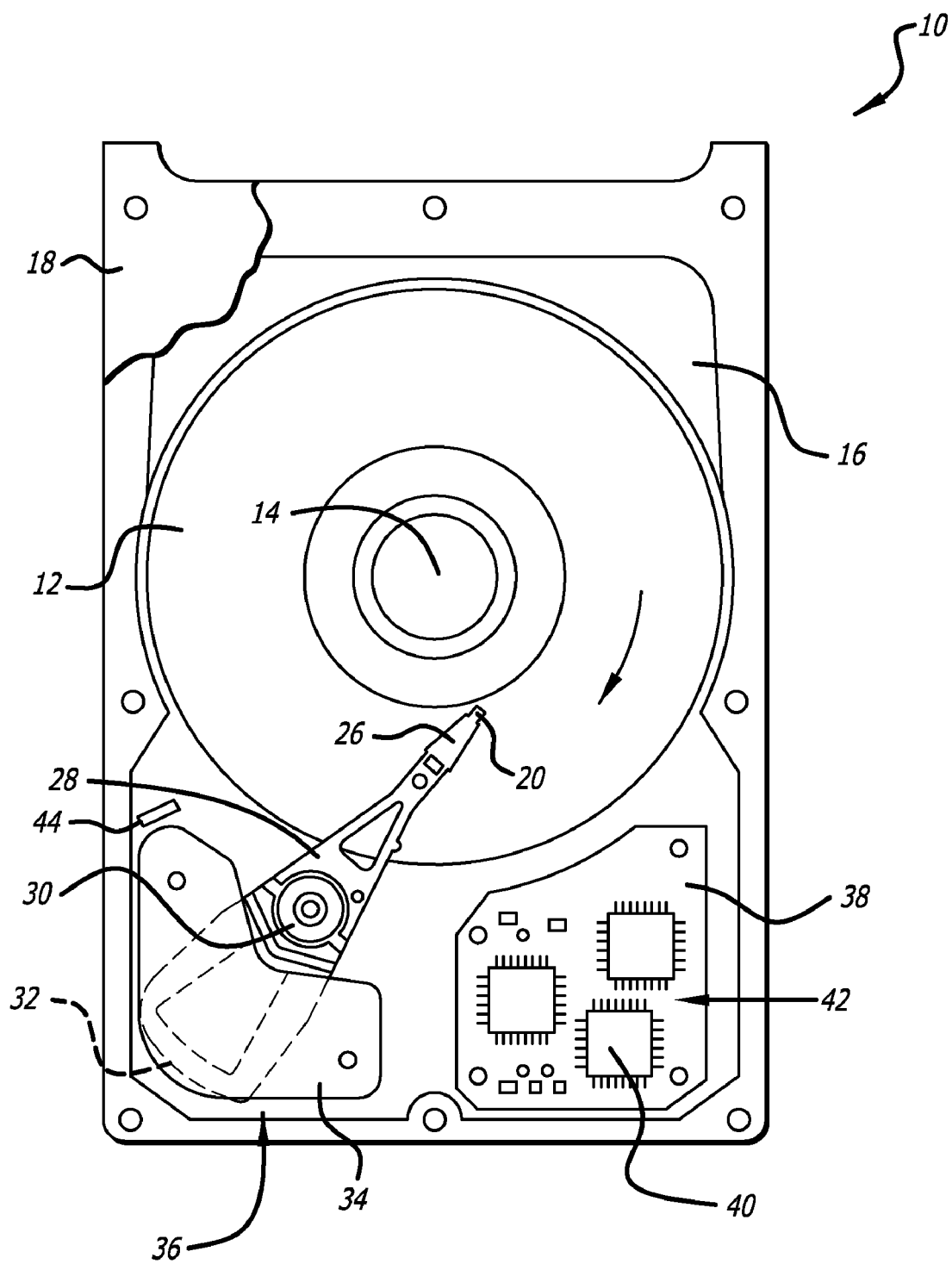
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12. The actuator arm 28 and voice coil motor 36 are also referred to as an actuator arm assembly.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

The disk drive 10 may include a ramp (not shown) that supports the heads when the heads 20 are moved off of the disk 12 in accordance with a retract routine. The drive also includes a retract magnet 44 that applies a magnetic force to the actuator arm 28 to maintain the heads 20 in the retracted position.

Figure 2:
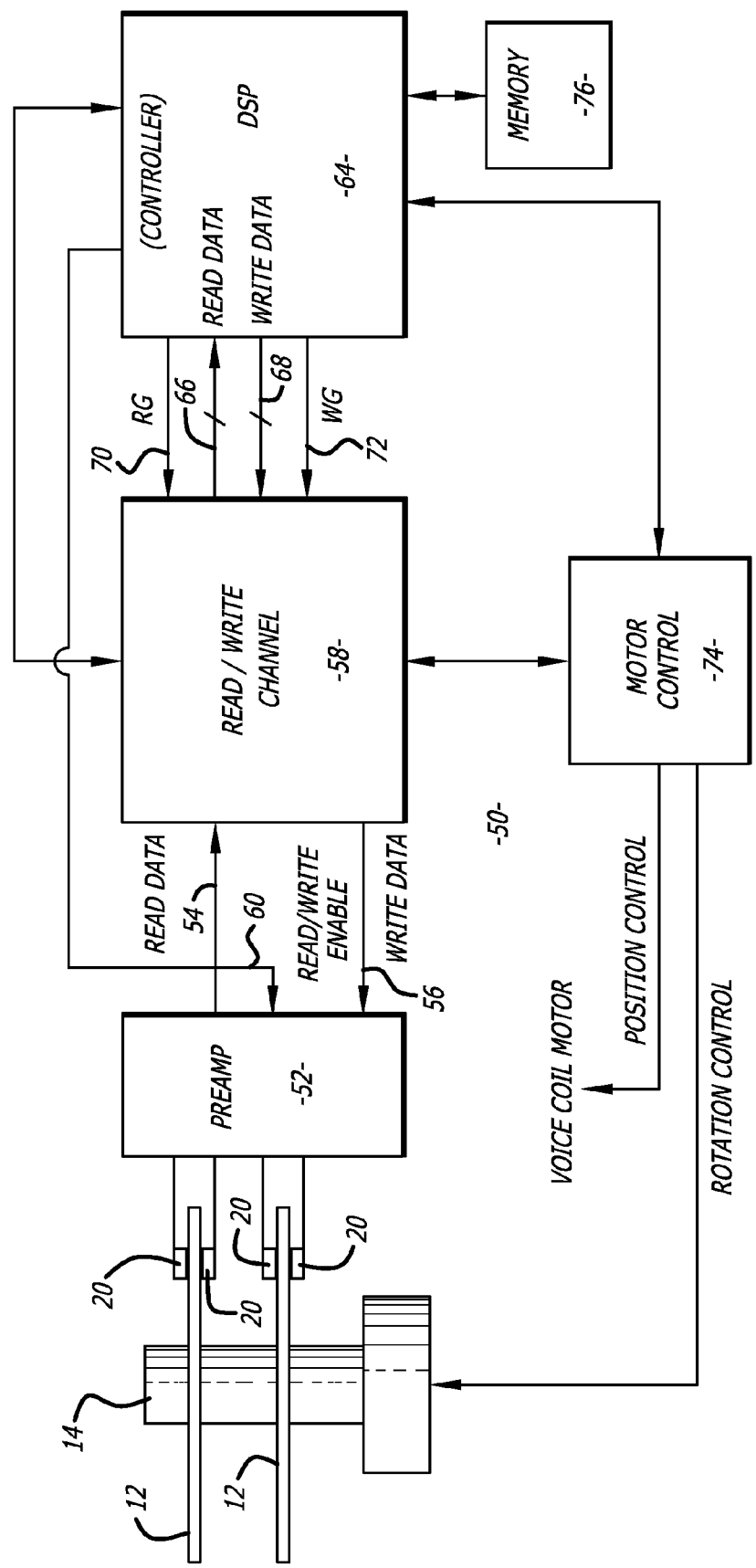
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The motor control circuit 74 provides a drive current to the voice coil motor 36 to move the heads 20 relative to the disk 12. The controller 64 may be connected to a non-volatile memory device 76. By way of example, the device 76 may be a read-only-memory ("ROM") that contains instructions that are read by the controller 64.

Figure 3:
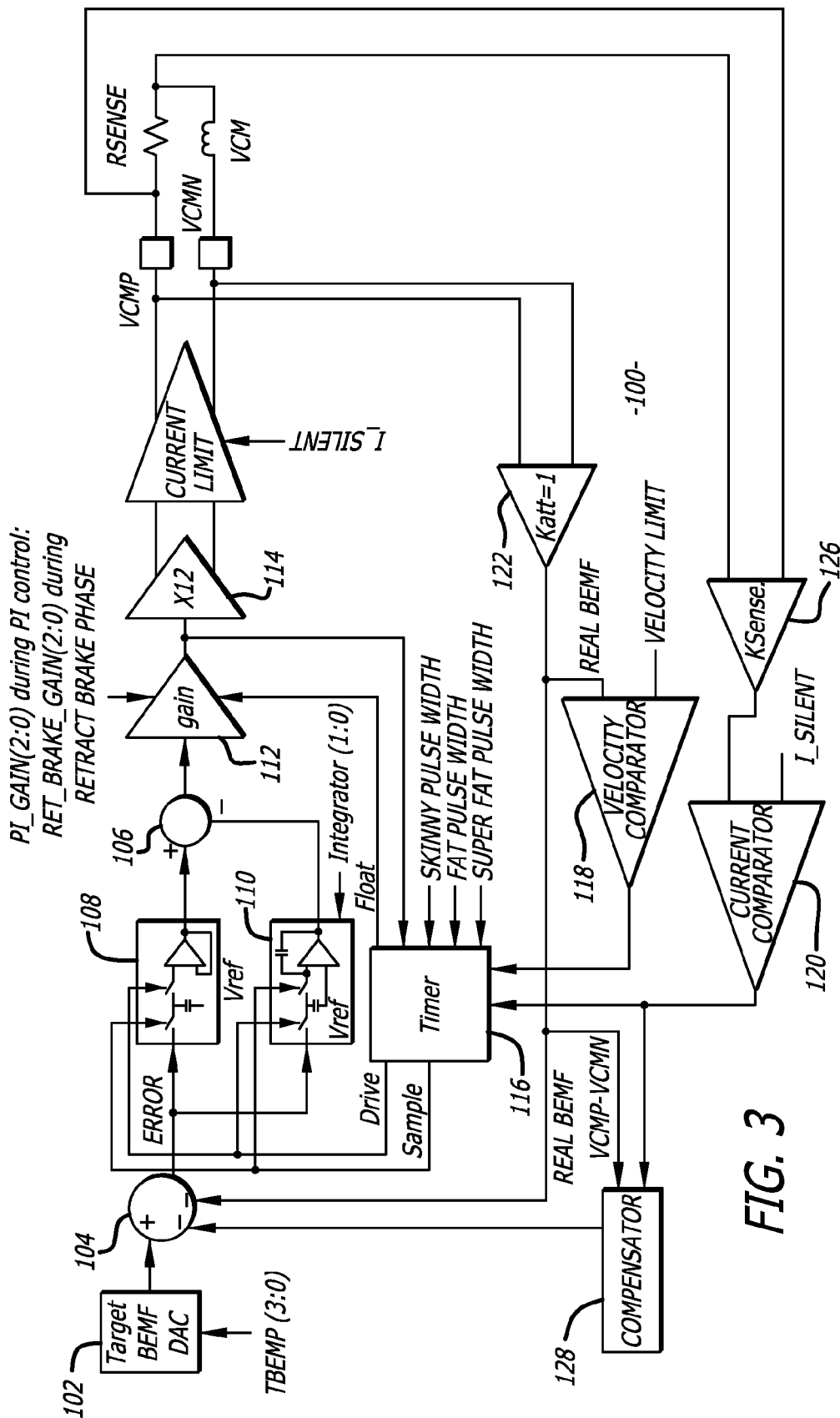
FIG. 3 is a schematic of a drive circuit used to retract the heads of the disk drive.

FIG. 3 is an embodiment of a drive circuit 100 that can be used to move the heads off of the disk and onto the ramp during a retract routine. The circuit 100 can be incorporated into circuit 58 and/or 64. The circuit 100 includes an input drive circuit source 102 that provides a target analog drive signal. The drive signal is varied by add nodes 104 and 106, converted to pulses by circuits 108 and 110, and amplified by amplifiers 112 and 114 before being provided to the voice coil motor 36. Add node 106 sums signals provided by the pulse circuit 108 and integrator circuit 116.

The pulse 108 and integrator 110 circuits generate pulses, that each have a width and an amplitude, in response to signals generated by a timer circuit 116. The timer circuit 116 has programmable input signals that allow for variations in the widths of the pulses. For example, the pulses may have three different pulse widths designated SKINNY, FAT and SUPER FAT. The inputs can be used to define the widths of the different pulses.

The timer circuit 116 also receives input from a velocity comparator 118 and a current comparator 120. The back emf input may be amplified by amplifier 122. The velocity comparator 118 compares the back emf of the voice coil to a threshold velocity limit. It is well known that the back emf of the voice coil is proportional to the velocity of the actuator arm and heads. If the back emf exceeds the threshold the comparator 118 provides an output to the timer 116. The timer 116 then varies the output to change the width of the pulses. For example, the pulse widths may change from SKINNY to FAT.

The current comparator 120 compares the voice coil current to a threshold current limit. The voice coil current may be amplified by amplifier 126. If the voice coil current exceeds a threshold the comparator 120 may provide an input to the timer 116 to vary the pulse widths. For example, the pulse widths may change from FAT to SUPER FAT.

The drive circuit 100 may also have a compensator circuit 128 that provides an input to add node 104. The compensator 128 receives input from the velocity 118 and current 120 comparators. The output of the compensator 128 can vary the amplitude of the pulses. For example, when the back emf (velocity) exceeds the velocity threshold the comparator 118 provides an output which causes the compensator 128 to increase the amplitude of the pulses. Likewise, when the voice coil current exceeds the current threshold the comparator 120 provides an output that causes the compensator 128 to increase the amplitude of the pulses. The amplitude of the pulses is limited by a current limiter 130.

Figure 4:
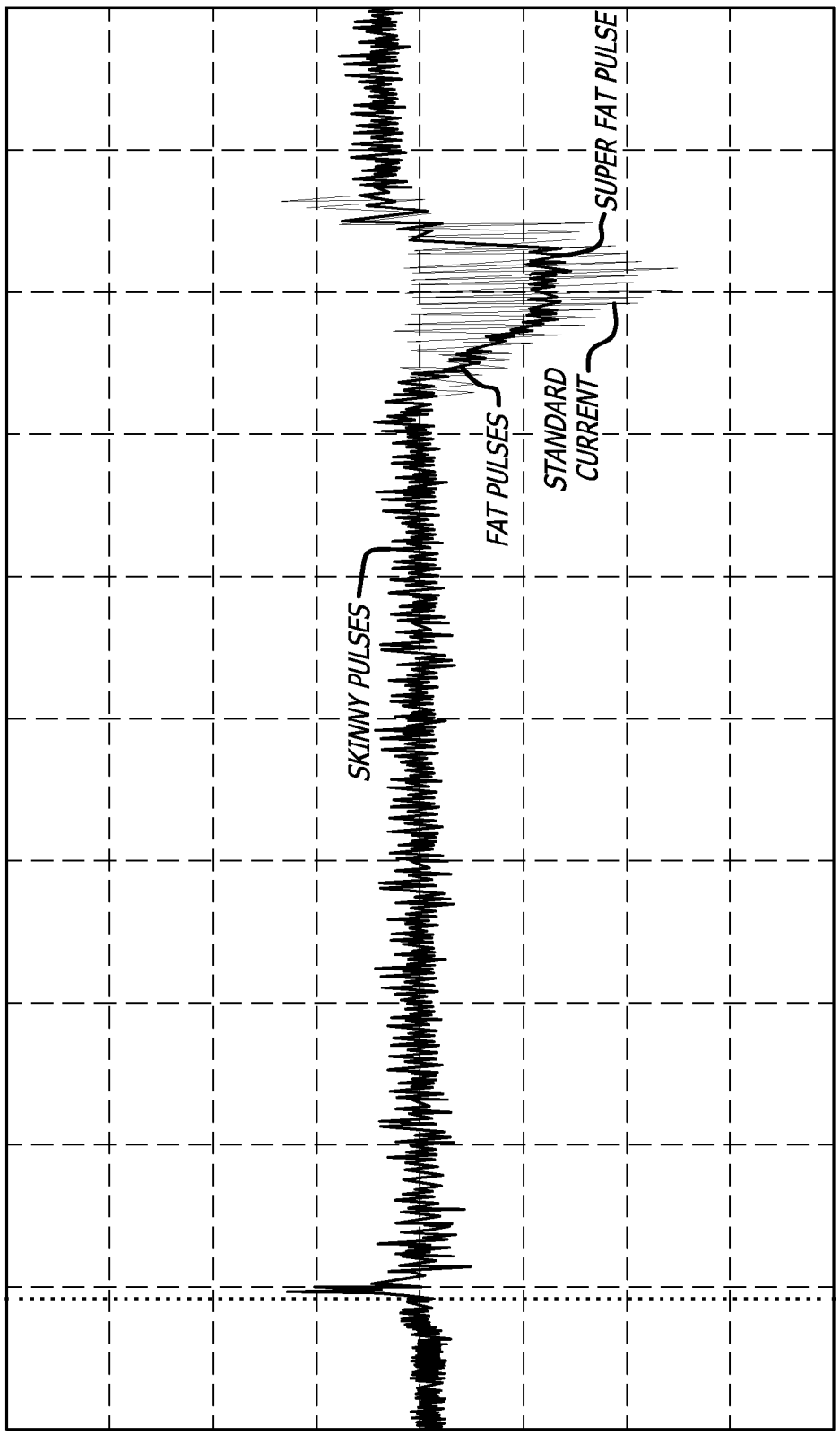
FIG. 4 is a graph showing the pulses of a drive current used to control the velocity of the heads during the retract routine.

FIG. 4 is an example of a drive current provided by the drive circuit to the voice coil when heads are moved off the disk and into the magnet in a retract routine. The drive current provides pulses with the SKINNY width to the voice coil to move the heads. At some point the magnet exerts a magnetic force that pulls the actuator arm and increases the velocity of the heads. When the velocity exceeds the velocity threshold the timer circuit changes the pulse widths to FAT and the compensator increases the pulse amplitudes. At yet another point the current exceeds the current threshold and the timer increases the pulse width to SUPER FAT and the compensator increases the amplitude.

The drive current shown in FIG. 4 has been superimposed onto a standard retract current of the prior art. By limiting the current the audible noise typically created during a head retract routine is reduced. The time interval during which the reversing current is provided to the voice coil during the retract routine may be increased to insure a sufficient amount of energy to slow down the actuator arm.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   an actuator arm assembly, coupled to said head, includes a voice coil motor;
   a retract magnet for maintaining said actuator arm assembly in a retract position; and
   a drive circuit for providing a drive current to said voice coil motor for moving said actuator arm assembly into contact with said retract magnet and limiting an amplitude of said drive current as said actuator arm assembly approaches said retract magnet, said drive circuit having a current comparator.

2. The hard disk drive of claim 1, wherein said drive circuit varies a width of each of pulses of said drive current as said actuator arm assembly approaches said retract magnet.

3. The hard disk drive of claim 2, wherein said drive circuit increases said width as said actuator arm assembly approaches said retract magnet.

4. The hard disk drive of claim 1, wherein said drive circuit includes a velocity comparator.

5. A hard disk drive, comprising:
   a disk;
   a head coupled to said disk;
   an actuator arm assembly, coupled to said head, includes voice coil motor;
   a retract magnet for maintaining said actuator arm assembly in a retract position; and
   a drive circuit for providing a drive current having a series of pulses, each having a width, to said voice coil motor to move said actuator arm assembly into contact with said retract magnet, said drive circuit varies said widths of said pulses of said drive current as said actuator arm assembly approaches said retract magnet, said drive circuit includes a current comparator.

6. The hard disk drive of claim 5, wherein drive circuit increases said width of said pulses as said actuator arm assembly approaches said retract magnet.

7. The hard disk drive of claim 5, wherein said widths of said pulses is increased in at least two steps.

8. The hard disk drive of claim 5, wherein said drive circuit includes a velocity comparator.

9. A method for retracting a head from a disk in a hard disk drive, comprising:
   initiating a head retract routine for moving an actuator arm assembly into a retract magnet;
   applying a drive current to a voice coil motor for moving the actuator arm assembly into the retract magnet;
   limiting an amplitude of the drive current; and
   varying a width of each of pulses of the drive current as the actuator arm assembly approaches the retract magnet.

10. The method of claim 9, wherein the width is increased as the actuator arm assembly approaches the retract magnet.

11. The method of claim 9, further comprising sensing a velocity of the actuator arm assembly and varying the width when the velocity exceeds a threshold value.

12. A method for retracting a head from a disk in a hard disk drive, comprising:
   initiating a head retract routine for moving an actuator arm assembly into a retract magnet;
   applying a drive current having a plurality of pulses each having a width, to a voice coil motor for moving the actuator arm assembly into the retract magnet; and
   increasing the widths of the pulses as the actuator arm assembly approaches the retract magnet.

13. The method of claim 12, further comprising sensing a velocity of the actuator arm assembly and varying the pulse widths when the velocity exceeds a threshold value.

14. The method of claim 12, further comprising sensing a current of the voice coil motor and varying the pulse widths when the current exceeds a threshold value.

* * * * *